United States Patent
Li et al.

(10) Patent No.: US 7,864,683 B2
(45) Date of Patent: Jan. 4, 2011

(54) WIRELESS COMMUNICATION METHOD WITH AIR-INTERFACE ENCODER PACKETS CONFIGURED FOR MORE EFFICIENT USE OF NETWORK RESOURCES

(75) Inventors: Shupeng Li, Highland Park, NJ (US); Shirish Nagaraj, Hoffman Estates, IL (US); Sudhir Ramakrishna, New York, NY (US); Ashok N. Rudrapatna, Basking Ridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 57 days.

(21) Appl. No.: 12/228,806

(22) Filed: Aug. 15, 2008

(65) Prior Publication Data

US 2010/0040157 A1   Feb. 18, 2010

(51) Int. Cl.
*H04J 1/16* (2006.01)
*H04L 12/28* (2006.01)

(52) U.S. Cl. .................................. 370/235; 370/392
(58) Field of Classification Search ................ 370/235, 370/392
See application file for complete search history.

(56) References Cited

U.S. PATENT DOCUMENTS

| | | | |
|---|---|---|---|
| 2003/0103481 A1 | 6/2003 | Heo et al. | 370/335 |
| 2003/0227875 A1 | 12/2003 | Wei et al. | 370/252 |
| 2004/0013089 A1 | 1/2004 | Taneja | 370/235 |
| 2004/0213174 A1* | 10/2004 | Engels et al. | 370/328 |
| 2006/0013268 A1* | 1/2006 | Terry | 370/537 |
| 2006/0187962 A1* | 8/2006 | Wakid | 370/474 |
| 2007/0153724 A1* | 7/2007 | Cheon et al. | 370/328 |
| 2007/0165578 A1* | 7/2007 | Yee et al. | 370/337 |
| 2007/0254595 A1* | 11/2007 | Yoon et al. | 455/67.14 |
| 2008/0159220 A1* | 7/2008 | Kitchin et al. | 370/329 |

FOREIGN PATENT DOCUMENTS

| | | |
|---|---|---|
| EP | 1557994 A2 | 7/2005 |
| WO | WO 99/16266 | 4/1999 |

OTHER PUBLICATIONS

Damnjanovic, A. D. et al., "Accepted From Open Call—Forward High-Speed wireless Packet Data Service In IS-2000—1xEV-DV", *IEEE Communications Magazine*, US, vol. 41, No. 8, Aug. 2003, pp. 170-177.
PCT/US2007/003181, Aug. 9, 2007, PCT Search Report.

* cited by examiner

*Primary Examiner*—Andrew Lee
(74) *Attorney, Agent, or Firm*—Martin I. Finston

(57) ABSTRACT

A method is provided for communicating data belonging to at least one application flow (AF). In one aspect, the method involves mapping the data to payload bits of two or more encoder packets (EPs) such that each said EP carries a payload dedicated to only one AF, and transmitting the EPs concurrently. In a second aspect, the above said mapping is inverted at a receiver.

8 Claims, 2 Drawing Sheets

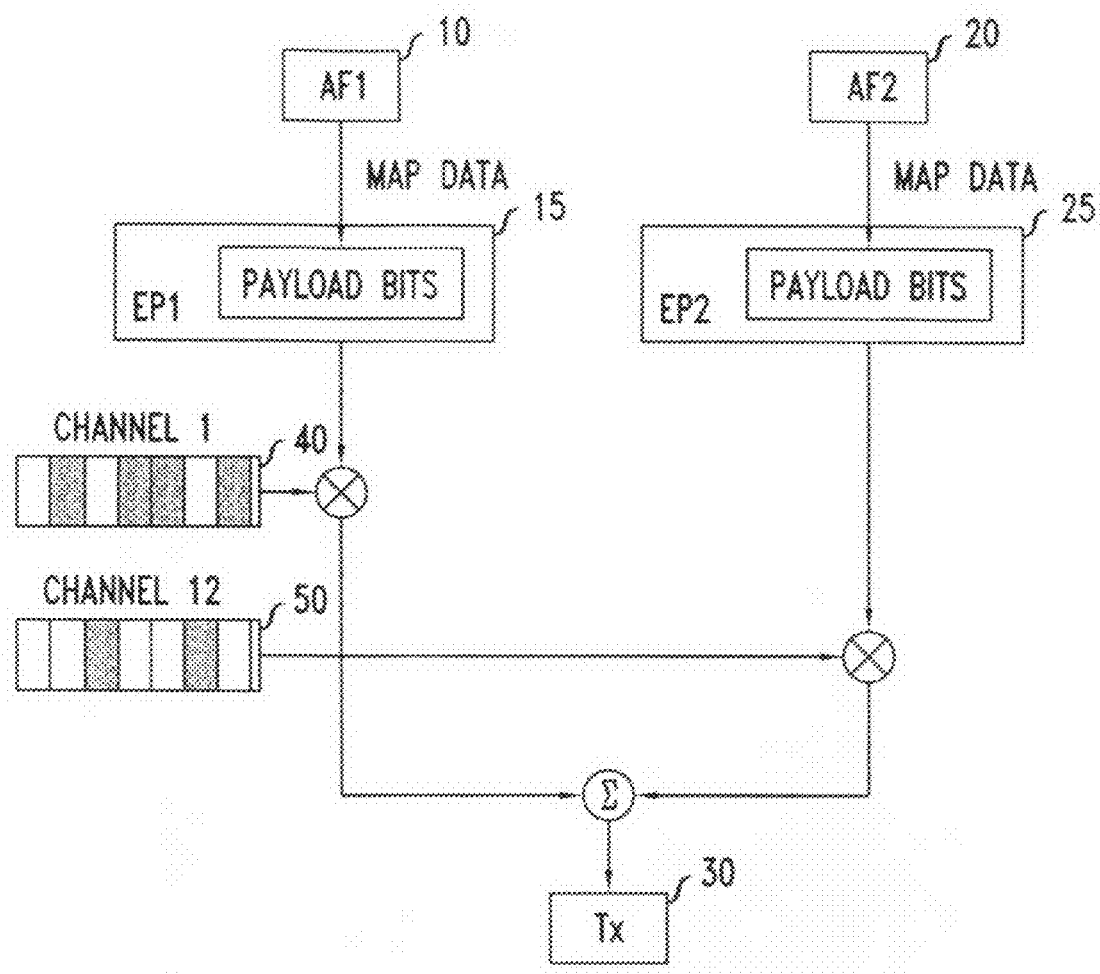

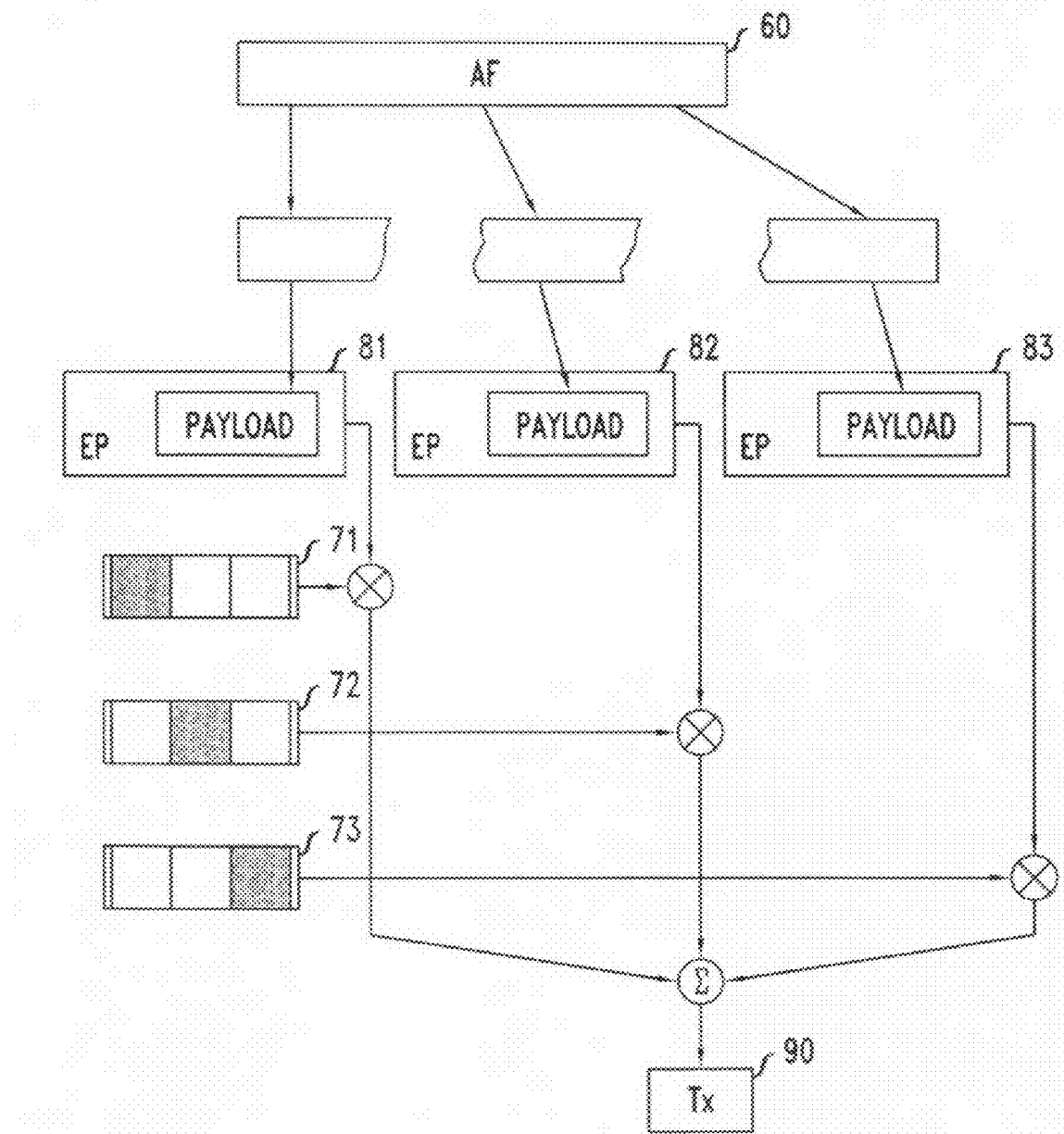

WIRELESS COMMUNICATION METHOD WITH AIR-INTERFACE ENCODER PACKETS CONFIGURED FOR MORE EFFICIENT USE OF NETWORK RESOURCES

CROSS-REFERENCE TO RELATED APPLICATIONS

This application claims priority of Provisional Application Ser. No. 60/774,347, which was filed Feb. 17, 2006, and of the PCT application US2007/003181, which was filed on Feb. 5, 2007.

FIELD OF THE INVENTION

This invention relates to packet-based wireless communication.

ART BACKGROUND

In a typical wireless, e.g. cellular, system, base stations (BSs) and mobile stations (MSs) communicate with each other over the air interface. Each BS controls a set of MSs, communicates with a set of MSs on the forward link (FL) from the BS to each MS, and listens to the communications from a set of MSs on the reverse link (RL) from each MS to the BS. For purposes of the discussion below, the flow of data may be bidirectional, and accordingly, each BS and each MS may function as both the transmitter and receiver of data.

The data flow over the air interface between the transmitter and receiver may take the form of encoder packets (EPs). The data to be transmitted is provided initially in the form of payload bits. An EP is a set of bits derived from the payload bits by applying a coding scheme and, typically, adding further bits related to control functions applicable to the link between the transmitter and the receiver. According to the coding scheme, a coding rule may be applied to add redundancy by mapping the payload bits to (typically a greater number of) coded bits.

An appropriate modulation scheme is then used to convert the EP bits into symbols appropriate for transmission over the air interface. Some examples of well-known modulation schemes are BPSK (binary phase shift keying), QPSK (quaternary phase shift keying), and QAM (quadrature amplitude modulation). Different modulation schemes may result in different numbers of bits being transmitted per symbol, i.e., per channel use. As a consequence, certain modulation schemes may work better than others for given channel conditions such as the signal to noise and interference ratio (SINR).

It is generally desirable to seek reliable reception of the EP, while also seeking insofar as possible to optimize the throughput, i.e. the number of bits carried per unit time between the transmitter and the receiver. An advantageous combination of these two performance measures may be sought through techniques such as any of the following, without limitation:

Coding, as mentioned above, to add redundancy leading to more reliable reception;

matching the modulation scheme to the characteristics, such as SINR, of the air interface link between the transmitter and receiver;

transmitting the EP with power sufficient to overcome the air interface channel impairments such as interference, since reception reliability will generally be at least roughly proportional to transmit power; and repeating failed (e.g., erroneous) EP transmissions, for example upon notification by the receiver. In general, the chance of successful EP reception increases with the number of re-transmissions.

The control information included in an EP allows the receiver to do error detection, i.e., for the receiver to know whether or not the payload bits in the EP were received successfully. According to one well-known method of error detection, the transmitter computes a function value using the transmitted payload bits as the input. This function value is then carried within the EP, in the portion designated for carrying control information portion.

The receiver, on receipt of the EP, computes the value of the same function, using the decoded payload bits as the input. The receiver then compares the locally computed value with the value carried in the control portion of the EP. If the values match, the receiver knows that the payload bits have been correctly decoded.

In the discussion below, we will refer to the control information embedded in the EP for error detection as the error detection indicator (EDI). One particular example of an EDI is the well-known Error Detection Code (EDC).

Below, our discussion will mainly concern communication between the transmitter and receiver for supporting user application flows. That is, the payload bits carried by the EPs originate from user applications. By "user application," we mean those software instructions and protocols that define, enable, and implement a packet-based communication service such as Internet-based video, VoIP, or any of various data and multimedia services. For example, a user may be accessing a multi-media website through the MS, in which case the communication between the MS and the BS would be to support the voice over IP (VoIP) and video application flows being downloaded from the website by the user.

An application flow (AF) may be characterized by its quality-of-service (QoS) requirements, which specify some parameters that must be met for that application flow to provide a user experience that is acceptable, for example according to qualitative criteria or according to specified quantitative criteria. For example, the QoS parameters for a flow may comprise a maximum amount by which flow packets may be delayed in transit from transmitter to receiver, and a minimum average throughput, i.e., number of flow bits sent from transmitter to receiver per unit time, that will correspond to a satisfactory user experience.

Since AF bits are carried from the transmitter to receiver via the EPs, the QoS associated with the AF will depend, at least in part, on the manner in which the AF bits are mapped to the EP payload bits. It will also depend, in part, on the coding scheme, modulation scheme, EP transmit power, and other parameters of the EPs that carry the AF. For example, if an AF has a tight delay requirement, the EP or EPs carrying that AF should be successfully received in very few transmission attempts. This, in turn, implies that codes with high redundancy, higher transmit power, or the like may be needed to assure dependable reception.

To map AF bits to the EP payload bits, at least some current networks follow the approach of mapping the bits from several distinct AFs into a common EP. The EP characteristics are then set to meet the most stringent of the several QoS requirements that apply to the respective AFs that the EP is intended to carry. For example, the transmit power for such an EP may be set based on the most stringent (i.e., lowest) delay requirement among the several AFs.

One drawback of such an approach is that by failing to consider the less stringent QoS requirements that apply to some AFs, it can waste transmitter resources. For example, setting the transmit power of the EP to the most stringent of the several QoS requirements will ensure that the AF subject to those requirements will meet them, but it also leads to the expenditure of resources for carrying other AFs with better performance than required. For example, it may lead to some AFs being carried with more than sufficient transmit power.

SUMMARY OF THE INVENTION

We have devised a method by which the AF bits can be mapped to the transmitted EPs in such a way that the EP characteristics to be tailored to the QoS requirements of specific AFs.

In one aspect, our invention involves such a mapping. In specific embodiments, our invention further involves a signaling scheme for synchronizing the transmitter and receiver with respect to such a mapping.

In a second aspect, our invention involves an EP transmission scheme designed to improve throughput by exploiting differences in air-interface channel conditions across the assigned bandwidth. According to such a scheme, the bandwidth assigned to a link is decomposed into orthogonal segments which are respectively assigned to different, concurrently transmitted EPs.

BRIEF DESCRIPTION OF THE DRAWING

FIG. 1 is a conceptual block diagram illustrating the concurrent transmission of two encoder packets (EPs), each relating to a respective application flow (AF) according to one example of the methods described here. Any number of EPs may likewise be concurrently transmitted; that only two have been depicted in the figure should not be understood as limiting.

FIG. 2 is a conceptual block diagram illustrating the concurrent transmission of three encoder packets (EPs) over which a single AF has been partitioned according to a further example of the methods described here. Any number of EPs may likewise be concurrently transmitted; that only three have been depicted in the figure should not be understood as limiting.

DETAILED DESCRIPTION

1. Mapping of Multiple AFs

According to the invention in a first aspect, the bits from each of two or more AFs are mapped to the payload bits of distinct EPs, which are then transmitted concurrently over the link between the transmitter and the receiver. For example, with reference to FIG. 1, there are two AFs 10, 20, denominated AF1 and AF2, to be mapped to respective EPs 15, 25, denominated EP1 and EP2 in the figure. The bits from AF1 are the input for computing the payload bits for EP1, and the EDI for EP1 is calculated using the AF1 payload bits. Similarly, the bits from AF2 are the input for computing the payload bits for EP2, and the EDI for EP2 is calculated using the AF2 payload bits. EP1 and EP2 are then transmitted concurrently (block 30 of the figure).

1(a). Bandwidth Decomposition.

In a system using an air interface technology that permits the assigned bandwidth to a link to be decomposed into orthogonal segments, the multiple EPs are transmitted on distinct, mutually orthogonal sub-bands 40, 50 of the assigned bandwidth. Advantageously, the size of each sub-band is made proportional to the size of the EP being transmitted on it. That is, the bandwidth assigned to the link is partitioned into a plurality of orthogonal sub-bands, each of which is proportional in size to the size of the EPs to be carried. Within the same symbol transmission interval, all of the EPs are transmitted in parallel, each on the sub-band corresponding to its size. It should be noted in this regard that a sub-band need not consist of contiguous bandwidth. That is, an EP may be transmitted on a sub-band which consists of a plurality of non-contiguous subbands separated by portions of the spectrum designated for other purposes.

A designated entity will decide on the number and sizes of the sub-bands into which the assigned bandwidth is to be partitioned. This decision will typically be made at the transmitter, based on the state of the various AF buffers at the transmitter. Since each sub-band may carry an EP, the receiver also needs to know the partition in order to be able to receive and decode the EPs. Hence, the transmitter must signal the bandwidth partition to the receiver. This may be done, for example, according to the following:

Before transmitting the EPs that carry the AF, the transmitter signals the number of EPs it will transmit on the assigned bandwidth.

The transmitter signals the fractions of the assigned bandwidth that will be used to carry the EPs, i.e., the sizes of the respective sub-bands that make up the orthogonal partition of the assigned bandwidth. In addition, for each sub-band, the transmitter also signals the locations of the bandwidth resources that make up the sub-band.

In order to further reduce the resources required for this signaling, a set of possible partitions may be determined in advance and known to both the transmitter and the receiver. In such a case, it is sufficient for the transmitter to send information, such as an index, identifying which partition is to be selected.

In the event that the sub-bands consist of contiguous bandwidth, the following simplified procedure may be used:

Let us say N EPs are to be transmitted on the assigned bandwidth, and the bandwidth is partitioned into N sub-bands, with sub-band 1 occupying F1% of the assigned bandwidth contiguously, sub-band 2 occupying F2% contiguously, and so on, with sub-band N occupying FN% contiguously. Then, the transmitter communicates to the receiver the respective fractions F1, F2, . . . , FN.

1(a)(i) Specific Air-Interface Technologies. In particular, OFDM (orthogonal frequency division multiplexing) and MC-CDMA (multi-carrier code division multiple access) are examples of air-interface technologies in which the assigned link bandwidth may comprise a plurality of assigned sub-carriers, and in which each such sub-carrier is orthogonal in frequency to each of the other sub-carriers. Thus, the set of assigned sub-carriers may be partitioned into subsets, with the number of sub-carriers in each subset at least approximately proportional to the size of that EP which is to be transmitted on that subset. By virtue of the orthogonality of OFDM and MC-CDMA subcarriers, the respective EPs can be transmitted concurrently.

For example, the transmitter may send signal information indicating the number of sub-carriers (e.g., as a percentage of the total assigned sub-carriers), and their positions within the assigned bandwidth. These make up the subsets on which the EPs are carried. In particular, the sub-bands may consist of contiguous sub-carriers.

1(b) Non-Decomposable Bandwidth.

Some air-interface technologies do not permit the assigned bandwidth to be decomposed. In a system using such an air-interface technology, each of the multiple EPs will be transmitted on the entire assigned bandwidth, concurrently with the other EPs.

In such a case, the transmitter will signal to the receiver the number of distinct EPs to be transmitted, and will identify characteristics that enable the respective EPs to be distinguished despite the fact that they occupy the same bandwidth.

Code Division Multiple Access (CDMA) is one example of an air-interface technology in which transmissions may occupy the entire system bandwidth. In CDMA, different orthogonal codes are used to modulate individual transmissions, thereby to make them distinguishable from each other at the receiver. When our method is applied to a CDMA link, the multiple EPs, belonging to respective AFs, are transmitted concurrently, each using the entire system bandwidth, but each EP using a distinct code.

It should be noted in this regard that well-known methods of multicode transmission may be used to increase the data rate by concatenating several codes within a single EP.

The transmitter communicates the number of EPs that are to be transmitted, and may also identify the respective codes it will be using. Alternatively, the codes may be selected according to a predetermined scheme. In such a case, it may be unnecessary for the transmitter to explicitly indicate the code assignments.

1(c) Setting of EP Characteristics.

The EP characteristics other than bandwidth used (i.e., characteristics such as modulation scheme, coding scheme, transmit power, etc) may be set based on the QoS requirements of the AF being carried by the pertinent EP, the number of bits of the AF to be carried, and the air-interface channel conditions over the transmission bandwidth.

If the EP is to be transmitted over a sub-band which is less than the total assigned bandwidth, then the EP characteristics (for carrying a particular AF) may further be set according to the air interface channel conditions observed over the pertinent sub-band.

In order to minimize the use of signaling resources, it will generally be desirable for re-transmissions of EPs that failed in previous attempts to occur on the same sub-bands as the first transmission. However, if signaling resources do not need to be conserved, the ability to reassign sub-bands may be advantageous.

2. Partitioning One AF to Multiple EPs

The concurrent transmission of multiple EPs in respective sub-bands may be adapted to the existing condition of the air-interface channel in order to improve total throughput. That is, the characteristics of each EP may be adapted to the conditions that describe the particular sub-band to which it has been assigned. In particular, a single AF may be partitioned among a multiplicity of concurrently transmitted EPs. Below, we will discuss the case in which a user has a single AF which is to be partitioned among multiple EPs. Additional AFs may be partitioned among additional EPs which are also concurrently transmitted. In the discussion below, which makes reference to FIG. 2, we will assume for simplicity that only one AF 60 is being partitioned in the above-described manner.

The transmitter partitions the assigned bandwidth into orthogonal sub-bands 71-73, based on its knowledge of the air interface channel across the assigned bandwidth. The partition is such that the air interface channel conditions are similar across a sub-band.

In particular, in OFDM and MC-CDMA as described above, the transmitter partitions the assigned set of sub-carriers into subsets of sub-carriers.

A separate EP 81, 82, 83 is transmitted (block 90 of the figure) in parallel on each of the sub-bands 71-73. The EP characteristics are matched to the air interface channel conditions over the sub-band on which the EP is transmitted.

Prior to the EP transmissions, the transmitter signals to the receiver the number of EPs that will be transmitted, and identifies the portions of bandwidth on which the respective EPs will be transmitted.

In particular, for OFDM and MC-CDMA, the transmitter conveys the number of EPs and the subset of sub-carriers over which each will be transmitted.

To conserve signaling resources, it is advantageous for the re-transmissions of EPs that failed in previous attempts to occur on the same sub-bands as the first transmission.

In the event that the transmitter does not have detailed knowledge of the air-interface channel conditions (or to minimize signaling resources), the transmitter may split the assigned bandwidth into a number of orthogonal sub-bands of equal size. In such a case, the transmitter may convey (prior to the EP transmissions) the number of sub-bands, as well as the size of any sub-band. Also in such a case, the EP characteristics may be set to be identical in all sub-bands.

3. Receiver

At the receiver, the signaling messages from the transmitter will be decoded and used to interpret the incoming EP transmissions. In particular, the pertinent frequency sub-bands or code channels will be identified and the receiver appropriately configured to receive the EPs on those sub-bands or code channels.

We claim:

1. A method for transmitting data belonging to at least two application flows (AFs), comprising:
   in a transmitter, mapping the data to payload bits of a plurality of encoder packets (EPs) such that each said EP carries a payload dedicated to only one AF; and
   transmitting the plurality of EPs concurrently over a plurality of subchannels,
   wherein the mapping step comprises partitioning the data belonging to at least one of the AFs over two or more of the concurrently transmitted EPs.

2. The method of claim 1, wherein, prior to transmission, the concurrently transmitted EPs are modulated onto respective mutually orthogonal spreading codes.

3. The method of claim 1, wherein the concurrently transmitted EPs are transmitted on respective, distinct frequency sub-bands.

4. The method of claim 3, wherein each said sub-band is proportional in bandwidth to the size of the EP being transmitted on it.

5. A method for receiving data belonging to at least two application flows (AFs), comprising:
   in a receiver, concurrently receiving a plurality of encoder packets (EPs) from a plurality of subchannels, each of said EPs carrying a payload dedicated to only one AF, and
   de-mapping the data from the payload bits of said EPs,
   wherein the de-mapping step comprises recovering the data belonging to at least one of the AFs from a combination of two or more of the concurrently transmitted EPs.

6. The method of claim 5, wherein the concurrently received EPs are demodulated from respective mutually orthogonal spreading codes.

7. The method of claim 5, wherein the concurrently received EPs are received on respective, distinct frequency sub-bands.

8. The method of claim 7, wherein each said sub-band is proportional in bandwidth to the size of the EP that was transmitted on it.

* * * * *